T. G. DADE.
CASTER.
APPLICATION FILED NOV. 7, 1911.
1,051,697.
Patented Jan. 28, 1913.
Fig. I.
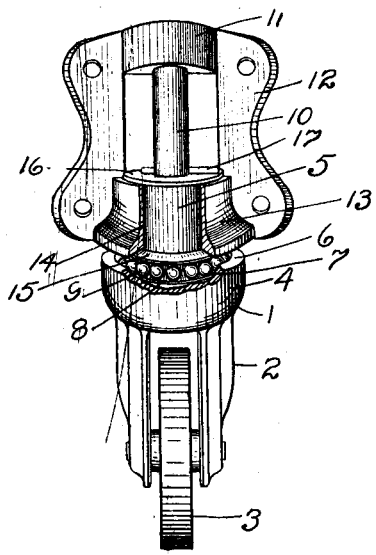
Fig. II.
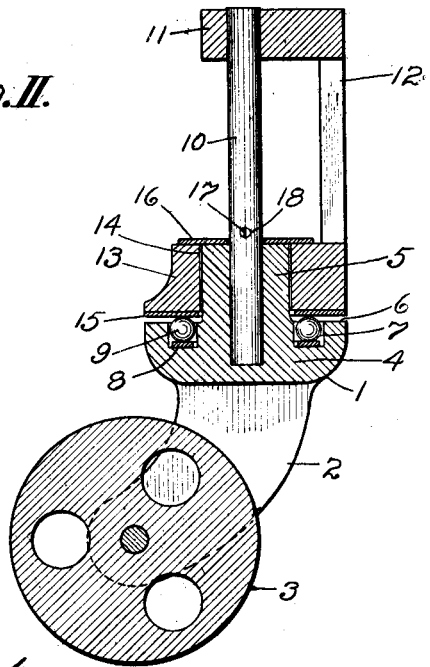
WITNESSES:
Arthur W. Capp.
R. R. Wade
INVENTOR
T. G. Dade.
BY
Arthur C. Brown
ATTORNEY

UNITED STATES PATENT OFFICE.

THOMAS G. DADE, OF KANSAS CITY, MISSOURI.

CASTER.

1,051,697.

Specification of Letters Patent.

Patented Jan. 28, 1913.

Application filed November 7, 1911. Serial No. 659,013.

*To all whom it may concern:*

Be it known that I, THOMAS G. DADE, a citizen of the United States, residing at Kansas City, in the county of Jackson and State of Missouri, have invented certain new and useful Improvements in Casters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to casters, and more particularly to a device of that character having a ball bearing between the fixed and swiveling members, the principal objects of my invention being to provide the members of the caster with durable bearing plates, which are preferably removable in order that they may be replaced when they have become worn or damaged.

It is a further object of my invention to strengthen or brace the pintle to prevent its bending under the strain of rough usage.

It is a further object of my invention to provide the improved details of structure hereinafter described and illustrated in the accompanying drawings, wherein:—

Figure I is a perspective view of a caster constructed according to my invention, parts being broken away to show the bearings and the pintle-boss. Fig. II is a central vertical section of the caster. Referring more in detail to the parts:—1 designates a swiveling or rotating member, comprising a fork 2 within which a wheel 3 is revolubly mounted, and a head 4. Rising from the center of head 4 is a boss 5, which is circular in cross section and serves as an axle around which the truck member may revolve, or as a spindle for turning within the truck member. The body portion of head 4 forms a shelf 6 around the boss 5, which is flat on top and has a downset circular ball race 7, preferably arranged closely adjacent to the boss. Seated in the race 7 is a ring 8, which is preferably flat and formed of steel or other metal having better wearing qualities than the material of which the head 4 is constructed. Located within the race 7 are bearing balls 9, which project through the top of the race and above the plane of the shelf 6. Fixed in the boss 5 and rising from the center thereof is a shank 10, the upper end of which is revolubly mounted in the lug 11 of a truck bracket 12. On the lower end of bracket 12 is a head 13 having an opening 14 therein into which the boss 5 of the lower member is projected and within which said boss is adapted to revolve with as little lost motion as possible. Surrounding the boss 5 and interposed between the bottom of head 13 and the bearing balls 9 is a steel or other hard metal plate 15 which forms a smooth, hard bearing surface for the upper part of the balls.

The parts are so arranged and constructed that the upper faces of the boss 5 and head 13 are in substantially the same plane, and the parts are held against displacement by a washer 16 which surrounds the shank 11 and bears against the top of the boss and also against the top of the head 13.

17 designates a cotter pin which extends through an aperture 18 in the shank and is adapted to hold the parts together without lost motion, while permitting free revoluble movement of such parts relative to each other.

In using the caster, presuming the bracket to be attached to a truck or the like (not shown) and the parts to be assembled as described, the use is similar to any ordinary caster, except that the swiveling is much freer owing to the presence of the anti-friction bearing and particularly to the presence of the hard, smooth bearing plates.

Should the plates become worn or damaged the ground member of the caster may be easily and quickly separated from the truck member, the anti-friction balls removed and one or both of the bearing plates replaced with new ones. When the parts are reassembled the caster is practically as good as new owing to the fact that all of the weight is carried on the bearing plates, and that these are the only parts that are subject to destructive wear.

By providing the lower head with a pintle an enlarged bearing is provided for the bracket head, so that the shank is not bent under sudden strains, caused by twisting of the caster when traveling over uneven flooring, or otherwise.

It is readily apparent that the arrangement of the ball race and open plate may be reversed or that the plates may be curved to form a race in themselves, but as such modified arrangement and construction is obvious, it has not been illustrated.

Having thus described my invention, what I claim as new therein and desire to secure by Letters-Patent is:—

1. In a caster, a bracket member having a head and a lug, provided with apertures of different diameter, a revoluble member comprising a head, having a boss revolubly mounted in the aperture in the bracket head, a shank carried by said boss and revolubly mounted in the aperture in the bracket lug, and a pin carried by said shank for holding the revoluble and bracket members together.

2. In a caster, a bracket member having a head and a lug, provided with apertures of different diameter, a revoluble member comprising a head, having a boss revolubly mounted in the aperture in the bracket head, a shank carried by said boss and revolubly mounted in the aperture in the bracket lug, a washer surrounding the shank and overlying the bracket head and said boss, and a pin passing through said shank above said washer for holding the revoluble and bracket members together.

3. In a caster, a bracket member having an apertured head and a lug spaced from said head, a revoluble member comprising a head having a central circular boss revolubly mounted in the aperture in said bracket head, and having a ball race in its upper face surrounding said boss, a removable flat bearing plate carried in the bottom of said race, balls located in said race and extending above the plane of the head, a loose flat bearing plate interposed between the balls and the bottom of the bracket head, a shank rising from said boss and extending into said lug, a washer surrounding said shank and bearing against the top of the boss and the revoluble member head, and a cotter pin carried by said shank and keeping the washer.

In testimony whereof I affix my signature in presence of two witnesses.

THOMAS G. DADE.

Witnesses:
ROBERT WADE,
MYRTLE M. JACKSON.